Patented Jan. 8, 1946

2,392,457

UNITED STATES PATENT OFFICE 2,392,457

BITUMINOUS EMULSION AND PROCESS OF PREPARING SAME

Walter D. Buckley, Berkeley, and Edwin P. Bly, San Francisco, Calif., assignors to American Bitumuls Company, San Francisco, Calif., a corporation of Delaware No Drawing. Original application September 12, 1939, Serial No. 294,504, now Patent No. 2,372,658, dated April 3, 1945. Divided and this application August 3, 1942, Serial No. 453,418

7 Claims. (Cl. 252—311.5)

This invention relates to the manufacture of emulsions and more particularly to bituminous emulsions and process of preparing the same.

The term "bituminous emulsions" as used herein embraces emulsions of asphalt, wax, pitch, tar, oil and other similar hydrocarbon or organic products which are normally solid, semi-solid or highly viscous. The viscous or tacky nature of these materials makes difficult direct application as binders, impregnants or superficial coatings while in a continuous liquid phase. These difficulties have led to the use of emulsions for such purposes. Water is generally adopted as the vehicle and is usually the continuous phase of the emulsion which surrounds the individual dispersed particles of the bituminous material. The dispersed bitumen comprises the internal phase of the preferred emulsion of this invention. However, in its broader aspects the invention does not preclude the preparation and stabilization of water-in-oil type emulsions with the new stabilizer herein disclosed.

Bituminous emulsions have commonly been used as binders and saturants for mineral aggregates and fibrous materials. Fibrous materials waterproofed with bituminous emulsions are useful as roofing materials, in the construction of automobiles, as liners for shoes and for many other purposes. When mixed with mineral aggregates, bituminous emulsions have found particular utility in the pavement of highways, sidewalks, tennis courts and the like. More recently, the practical utility of particular types of bituminous emulsions for soil stabilization has been established. The oil-in-water type emulsions of the present invention are capable of all of the above applications and are adaptable for use wherever bituminous emulsions have heretofore been utilized.

Water-in-oil type emulsions, despite their high viscosity, are frequently applied in the coating of certain types of aggregates such as hydrophilic aggregates where satisfactory wetting or adhesion is not obtainable with the oil-in-water type of emulsion. Within the broader scope of this invention, such water-in-oil type emulsions stabilized with the novel stabilizers hereinafter described may be prepared. Such emulsions are particularly adaptable for coating of hydrophilic aggregates as well as for other specialized uses.

It is an object of this invention to produce a bituminous emulsion which will remain stable, usable and free from objectionable properties even though stored at high temperatures, such as are encountered in the summer, for relatively long periods.

A further object of the invention is to produce a bituminous emulsion which will retain its ability to mix with foreign materials and be free from coagulation or breakdown during repeated cycles of freezing and thawing and which can therefore be satisfactorily stored in cold regions during the winter.

A further object of the invention is to produce an emulsion which upon drying after application as a coating will give a bright, shiny, tacky surface in which the dispersed bituminous particles actually coalesce to form a substantially continuous phase.

An additional and important purpose of the invention is to produce a bituminous emulsion efficient in imparting high load carrying capacity to soils and other mineral matter in the presence of water and/or imparting resistance to absorption of water.

Still another purpose is to provide an economical stabilizing agent for bituminous emulsions which is resistant to deterioration by alkali, is effective to stabilize the emulsion against coalescence or breakdown when mixed with electrolytes, aggregates, Portland cement and the like, and which is resistant to denaturization in the presence of aqueous alkaline solutions at relatively elevated temperatures.

An additional object comprises production of novel stabilizers for emulsions.

It is known that certain bituminous materials naturally contain ingredients which react with alkaline materials such as caustic soda, caustic potash, soda ash, potassium carbonate, sodium metasilicate, trisodium phosphate and the like, in aqueous solutions to form emulsifying agents. The exact chemical constitution of these ingredients found in various asphalts is not known, but they are commonly designated in a generic manner as asphaltogenic acids. Their reaction products with alkali may be utilized either alone or in conjunction with other primary emulsifiers to produce bituminous emulsions.

This invention in its preferred embodiment comprises the stabilization of pre-formed bituminous emulsions in which the reaction products of an alkali with the naturally-occurring constituents of the bitumen are the sole primary emulsifying agents. However, it is apparent that the use of other emulsifying agents or of suitable auxiliary primary emulsifying agents, in addition to said reaction products, is within the scope of the invention in its broader aspect. For instance, high molecular weight naphthenic acids may be employed for emulsification as in the case of the previously mentioned asphaltogenic acids. The alkali salts of such naphthenic acids formed in situ during emulsification or added separately comprise alternative emulsifying agents. Likewise, high molecular weight acids formed by partial oxidation of petroleum hydrocarbons by methods known in the art, or acids such as those contained in montan wax when used as auxiliary primary emulsifiers, are regarded as within the broader scope of the invention. The alkali salts of these acids may be formed either separately or in situ during emulsification of the bitumen. On the other hand, the presence of fatty acid soaps in the emulsion has an undesirable effect on the action of the stabilizing agents herein disclosed. Pre-formed emulsions containing fatty acid soaps in small quantities can be stabilized by the method of this invention and are usable for certain purposes, but the stabilized emulsion usually has less desirable qualities than do emulsions substantially free of fatty acid soaps.

Illustrative methods of preparing bituminous emulsions suitable for stabilization according to this invention are disclosed in the patent to Montgomerie, No. 1,643,675 granted September 27, 1927, and in the patent to Braun, No. 1,737,491 granted November 26, 1929. The Montgomerie patent discloses emulsification by mixing melted bitumen directly with hot, dilute alkaline water. Braun forms a bituminous emulsion by adding molten bitumen and alkaline water to a pre-formed emulsion often referred to as a "mother liquor," which facilitates emulsification of the bitumen in the added alkaline water. Those skilled in the bituminous emulsion art recognize that alkaline water suitable for the above processes may be obtained by the addition of various alkaline materials and it is intended to include such alternative alkali, as well as other emulsifying agents such as those herein previously mentioned, within the scope of the invention and claims.

The stabilizing agents of this invention are particularly effective where caustic soda or caustic potash are the alkaline materials used to react with the asphaltogenic acids in the bitumen to produce emulsification.

Bituminous emulsions prepared by the Montgomerie or Braun methods are commonly termed "quick-breaking" or "quick-setting" emulsions because of their tendency to break down or separate into agglomerated masses when diluted with water, contaminated with electrolytes or foreign matter, or when combined with aggregates or fibrous material or applied to surfaces in the customary methods of handling. Other emulsions partake of quick-breaking characteristics to a greater or lesser degree depending on the character and quantity of emulsifying agent employed and the method of manufacture. Various expedients have been adopted in an effort to impart slow-setting or mixing properties to such quick-breaking emulsions and thereby render them stable against coalescence in the presence of electrolytes and adaptable to uses where the ability to mix with other substances rather than quick-setting properties are desired.

The addition of quantities of certain stabilizing agents insufficient in themselves to exert any substantial emulsifying action, but which by some unpredictable action effect stabilization of these emulsions, has been utilized in the prior art. Difficulties have been encountered with emulsions so stabilized, in some cases, because of the deleterious effects of even small quantities of certain stabilizing agents on the bitumen deposited from the emulsion and because of deterioration of the stabilizing agents after incorporation and their consequent loss of beneficial action.

Prior experience has shown that the suitability of unproven stabilizing agents for bituminous emulsions is, as a rule, unpredictable and that generalities are inapplicable in these highly empirical developments. As an example, various statements in the literature indicate that proteins as a class may be used as stabilizers for bituminous emulsions and that they may be substituted one for the other as substantial or full equivalents. As a matter of fact, such teachings are erroneous, at least insofar as production of practical emulsions suitable for commercial purposes is concerned.

Blood has been proposed as a stabilizing agent. Where liquid blood has heretofore been adopted, it has been regarded as absolutely essential that the blood be defibrinized, i. e., have the fibrinogen removed therefrom as fibrin by suitable known treatments, such as whipping with a bundle of wires, so that the blood will not coagulate. This defibrinization was thought necessary because fresh liquid blood coagulates to form a gel when allowed to stand in air or when contacted with extraneous agents, and there was no known way of utilizing such a coagulated semi-solid material as an emulsion stabilizer.

Contrary to the above prior knowledge and teaching of the art, this invention utilizes liquid blood as a stabilizer without defibrinization thereof. It has been discovered that a homogeneous liquid blood containing the coagulants fibrinogen or fibrin, or both, naturally present in blood may be advantageously utilized as a stabilizer to give a bituminous emulsion having the desirable properties disclosed in this specification. Stabilization with homogeneous liquid blood containing said coagulants is particularly advantageous in that it avoids not only the time and expense necessitated by defibrinization but also avoids the loss of useful colloids normally present in the blood which are entrapped and removed during defibrinization. Further, use of whole liquid blood rather than dried blood avoids treatment of the blood by heating to produce evaporation and the concomitant careful control heretofore essential to preclude substantial deterioration of the protein bodies in the blood and consequent loss of stabilizing properties.

According to the process of this invention, the liquid blood containing coagulants must be suitably treated in order to render it adaptable for the stabilization of emulsions. Such treatments involve homogenization of the blood, preferably after coagulation, to disperse the fibrin substantially uniformly throughout the material, or the incorporation of suitable agents in the blood which inhibit gelling or coagulation by preventing conversion of the fibrinogen to fibrin and thereby maintain the blood in a homogeneous condition. It should be observed that the suitability and effectiveness of blood containing coagulants as a stabilizer for bituminous emulsions could not be predicted. It was not apparent that whole liquid blood could be treated to render it useful as an emulsion stabilizer because one might expect to encounter difficulties from gelling or coagulation. For example, blood alone, homogenized as taught herein, tends to collect on and plug sieves by reason of the presence of the coagulant fibrin, and one might anticipate that this same action would occur after addition to the bituminous emulsion with the result that the product would not pass a screen test specified for most commercial emulsions. Also, gelling of the completed emulsion could be expected from the potent gelling agent, blood. Likewise, one might anticipate that addition of precipitants for the calcium ion would not be effective to prevent the normal gel-forming tendency of the fibrinogen after dilution and in the presence of the emulsifying agents for bituminous emulsions— this particularly in view of the fact that emulsions often tend to form gels, even in the absence of the coagulating or gelling agents present in blood.

Homogenization of coagulated blood may be effected for the purposes of this invention by passing the blood first through a centrifugal pump and then through a suitable type of homogenizer, such as a colloid mill or high speed centrifugal mixer. The invention is not limited to this particular method of homogenization, since other alternatives will readily occur to those skilled in the art. For example, one may simultaneously homogenize the blood and stabilize the emulsion by passing whole blood, either coagulated or uncoagulated, with the emulsion through a colloid mill.

After the blood is homogenized, it is not necessary to immediately incorporate the product in an emulsion, since the homogenized liquid blood retains its fluid characteristics, and when it contains suitable preservatives, may be stored, shipped or sold as a stabilizer for emulsions.

When the homogenized coagulant containing liquid blood is not to be utilized immediately by addition to emulsions, a preservative should be incorporated. Suitable preservatives are sodium arsenite, formalin solution (40% formaldehyde in water), phenol or phenolic compounds, and the like. For example, 0.2% by weight of formalin may be utilized. Also, 1 pint of kerosene per 55-gallon drum of blood or 1 pint of turpentine or 1 ounce of naphthalene flakes may be incorporated to render the product inedible if required by the Bureau of Animal Industry. When the blood is preserved in this manner, for most uses of the bituminous emulsion stabilized therewith, additional preservative will be found unnecessary. In some cases additional preservative, e. g., 0.1% of formalin, may be added to the completed emulsion.

As previously implied, an alternative method of treating the blood-containing coagulants comprises the incorporation of precipitants for the calcium ion, either with or without homogenizing treatment. Suitable materials are sodium oxalate, potassium oxalate, sodium citrate, potassium citrate, sodium fluoride, or other salts, such as the sodium phosphates which react with the calcium ion to remove the same from the blood. Hirudin and heparin prevent conversion of fibrinogen to fibrin with consequent avoidance of coagulation and may be utilized for this purpose. Where circumstances dictate avoidance of homogenization of the blood, it may be collected in non-wettable containers, such as paraffin-coated vessels, to delay the clotting or coagulating action of the fibrinogen and promptly treated with an agent for preventing gelling, as above disclosed.

In stabilizing an emulsion according to this invention, sufficient of the homogeneous coagulant containing liquid blood should be incorporated to give at least 0.1% by weight of blood solids based on the weight of the completed emulsion. The most effective range seems to be from 0.3% to 1.0% by weight based on the completed emulsion. The blood may be added while the emulsion is still hot from the manufacturing operation. High temperatures of the emulsion at the time of stabilization do not destroy the stabilizing action of the blood. Addition of the stabilizer to an emulsion which may have cooled to atmospheric temperatures below approximately 100° F. is not precluded, particularly where it is found inconvenient to handle a hot emulsion during the incorporation of the blood therein, or any temperature between atmospheric and manufacturing temperatures may be adopted.

An alternative method of stabilization comprises subjecting the asphalt or other bituminous material to powerful shearing forces in the presence of an emulsifying agent such as the aqueous alkaline solution hereinbefore disclosed, to form a fine dispersion of the asphalt in water. When the asphalt or bituminous material is of the type which does not emulsify in water containing an alkali alone, the fine dispersion formed with the aqueous alkaline solution is exceedingly unstable and coalesces promptly unless immediately stabilized. Such stabilization may be effected by the immediate incorporation of the homogeneous coagulant containing liquid blood herein disclosed. Asphalts which do not emulsify with water containing a metal hydroxide alone to give a stable quick-setting emulsion may be satisfactorily emulsified according to this method in a colloid mill. The mill applies the powerful shearing forces previously referred to when the molten asphalt and hot alkaline solution containing the alkali are added thereto. A fine dispersion of the asphalt is initially formed and may be immediately passed to a second emulsifying zone where the unstable emulsion is promptly stabilized with the blood before coalescence has occurred. When coagulated blood is used as a stabilizer, it may also be simultaneously homogenized in this second emulsifying zone but addition of a previously homogenized blood is preferred. Another method of effecting formation of a satisfactory emulsion is to apply the alkaline aqueous solution in the colloid mill and stabilize the asphalt emulsion as formed in the mill by simultaneously incorporating the homogeneous blood stabilizer. Further, the stabilizer may be added to the aqueous alkaline solution prior to emulsification in the colloid mill. When an auxiliary emulsifier such as a small quantity of liquid rosin oil or other saponifiable material is utilized to aid initial formation of a quick-setting emulsion, the rosin oil may be introduced either into the colloid mill during emulsification or into the alkaline water prior to emulsification.

When preparing quick-setting emulsions of the Montgomerie or Braun type for stabilization according to this invention, an emulsion containing approximately 50% to 60% asphalt and 50% to 40% alkaline water is preferred. Water temperatures during emulsification may be maintained at 140° to 160° F., asphalt at 240° to 280° F., and the mixture at 200° to 210° F., to yield a satisfactory emulsion. These temperatures are not critical; for example, water temperature may be raised and asphalt temperature lowered to give the same resultant temperature in the mixture. The asphalt should be sufficiently hot to render it fluid in order that agitation and emulsification may be facilitated.

The degree of alkalinity of the completed stabilized emulsion is of critical importance when the emulsion is of the Montgomerie or Braun type. In the preferred embodiment of the invention, in making emulsions stabilized with homogeneous liquid blood containing coagulants by the preferred method, the finished product has a pH of 11.5+. Emulsions reaching a pH of less than 9.0 usually show an appreciable deterioration and a pH of 9.0 is regarded as the lowest safe limit of alkalinity for this preferred type of emulsion. Where during long storage chemical reactions occur and the pH tends to drop below 9.0, alkali may be added to raise the alkalinity of the emulsion above the critical point. The upper limit of pH concentration is, for the purposes of this invention, not critical within the range wherein the preformed emulsion is satisfactory, i. e., stable against coalescence of the dispersed phase under storage conditions ordinarily encountered. Adequate alkalinity is necessary in order to obtain a product having satisfactory storage and mixing properties.

In some instances and for some purposes, the stabilized emulsion is preferably neutralized to a point between pH 10 and pH 11. A suitable neutralizing agent is phosphoric acid, although other weakly acid solutions may be used. This partially neutralized although still alkaline emulsion has different physical characteristics from the un-neutralized product. For example, it has a more rapid rate of drying. The partially neutralized emulsion has greater resistance to heat deterioration, while the un-neutralized emulsion is more resistant to freezing. Thus, the partially neutralized emulsion has particular utility where resistance to heat or increased drying rate is of preeminent importance. The un-neutralized emulsion is preferred where Portland cement mixtures or similar compositions are to be made or where high resistance to freezing is required.

In addition to the stabilizer, it is usually found desirable to incorporate a colloidal clay such as bentonite in small amounts, e. g., 0.1% to 1.0% by weight to inhibit stratification or settlement of the dispersed bitumen either upwardly or downwardly through the aqueous phase. When the blood itself does not contain a preservative in suitable quantities and when the emulsion is not to be utilized promptly, it is usually necessary to incorporate a preservative for the stabilizer to prevent deterioration by mold or bacterial action.

It should be understood that the invention in its broader aspects is not limited to emulsions of pH greater than 9.0 as above described, since the invention is applicable to emulsions having various emulsifying agents and pH ranges.

To exemplify our invention in further detail the preparation, proportions and properties of emulsions utilizing this invention will now be described.

Emulsions were prepared by the Montgomerie process using a California asphalt. The emulsions were then stabilized with homogeneous liquid blood which had been allowed to coagulate and subjected to homogenization prior to incorporation in the emulsion. The blood stabilizer contained 0.2% formalin and 1 pint of kerosene per 55 gallons of the liquid blood. Table I gives the data on such emulsions with various percentages of the blood stabilizer.

*Table I*

| | | | | | |
|---|---|---|---|---|---|
| Per cent stabilizer (dry weight) | 0.05 | 0.10 | 0.25 | 0.50 | 1.00 |
| Added water per cent | 4.25 | 3.90 | 3.20 | 1.90 | 0 |
| Residue do | 57.0 | 57.2 | 57.2 | 57.0 | 56.8 |
| Demulsibility (0.02 N calcium chloride solution) | 65.3 | 27.1 | 0 | 0 | 0 |
| Demulsibility (0.10 N calcium chloride solution) | 100 | 100 | 0 | 0 | 0 |
| Viscosity (Saybolt Furol 77° F.) | 47.9 | 51.4 | 63.4 | 72.5 | 79.8 |
| Sieve | 0.022 | 0.018 | 0.005 | 0.003 | 0.002 |
| pH (glass electrode) | 11.9 | 11.8 | 11.9 | 11.9 | 11.75 |
| Cement mixing test | Failed | Failed | 10.0 | Passed | Passed |
| Drying | 0.423 | 0.485 | 0.540 | 0.560 | 0.555 |

To illustrate the use of precipitants for the calcium ion, the following data are given. Emulsions designated A were stabilized with liquid blood which had not been coagulated or defibrinized and containing 55.7 grams of dry sodium oxalate to each 5 gallons and 0.5% kerosene. In emulsion B liquid blood which had not been coagulated or defibrinized and containing 111.1 grams of dry sodium fluoride to each 5 gallons and containing 0.5% kerosene was utilized. The data on these emulsions is given in Table II.

*Table II*

| | A | | | B | | |
|---|---|---|---|---|---|---|
| Per cent stabilizer | 0.3 | 0.6 | 1.0 | 0.3 | 0.6 | 1.0 |
| Formalin percent | 0.3 | 0.3 | 0.3 | 0.3 | 0.3 | 0.3 |
| Residue do | 58.2 | 58.0 | 57.2 | 58.4 | 57.7 | 57.1 |
| Viscosity | 50.8 | 58.0 | 57.2 | 51.4 | 64.2 | 76.8 |
| Cement Mixing test | 3 gr. | Passed | Passed | Passed | Passed | Passed |
| Demulsibility | 0 | 0 | 0 | 0 | 0 | 0 |
| Sieve | Trace | Trace | Trace | Trace | Trace | Trace |
| pH | 11.8 | 11.8 | 11.8 | 11.6+ | 11.6+ | 11.8 |
| Drying | 0.414 | 0.654 | 0.770 | 0.433 | 0.613 | 0.760 |

Many variations in composition and uses are within the scope of the invention in its generic aspect. For instance, the bituminous material dispersed may be of either high or low melting point, solid, semi-solid or semi-liquid, depending on the properties desired of the deposited material. Hardness, ductility and fusibility of the bitumen may be altered and controlled by the use of blending agents.

Fibrous fillers such as asbestos, or organic fibers such as cotton and mineral pigment fillers such as ground petroleum coke, iron oxide, chromium oxide, or limestone dust may be added singly or in combination to the completed emulsion when desired. Such fillers and pigments may be mixed with the homogeneous blood stabilizer prior to incorporation in the emulsion, but are preferably incorporated separately therefrom and after it has been added to stabilize the emulsion.

A typical example of the proportions in which these materials may be satisfactorily mixed is as follows:

| | Per cent |
|---|---|
| Emulsion containing 50%–60% asphalt | 46 |
| Mineral pigment filler | 18 |
| Fibrous filler | 12 |
| Water in addition to that present in the original emulsion | 24 |

Inorganic cementitious materials other than the Portland cement hereinbefore disclosed may also be mixed with the stabilized emulsion. Hydrated lime and gypsum comprise two such cementitious materials.

The emulsion is adapted for use as a coating or water-proofing composition for metal, wood, or concrete structures; for impregnation of woven fabrics, felted fabrics and paper; for pipe sealing compounds; for electrical insulation compounds; for mixing with mineral aggregates in paving and other similar operations, and for soil stabilization processes wherein the emulsion is incorporated in the soil in a small amount insufficient to render the soil thermoplastic but sufficient to enable the soil mixture to retain its structural strength when wet.

By the term "homogeneous coagulant containing liquid blood," wherever used herein, it is intended to designate liquid blood containing fibrin or fibrinogen which would normally cause the blood product to be a semi-solid or to set up as a semi-solid clot or gel, but in which gel or clot is not present by reason of the treatments disclosed in this specification.

The term "coagulant" is utilized throughout the specification and claims to designate fibrinogen or fibrin.

"Liquefied coagulated blood," wherever used herein, designates liquid blood which has been allowed at least partially to coagulate and then subjected to a homogenizing treatment.

This application is a division of our parent application Serial No. 294,504, filed September 12, 1939, on "Emulsions and process of preparing same," now United States Patent No. 2,372,658, issued April 3, 1945.

Although preferred embodiments of the invention have been described in detail, it is to be understood that the invention is not limited thereto but comprehends all the variations and modifications within the scope of the appended claims.

We claim:

1. An oil-in-water type bituminous emulsion comprising bitumen, an alkaline aqueous phase having a pH greater than 9, a stabilizer comprising homogeneous liquid blood which contains fibrinogen in an amount normally sufficient to produce clotting thereof, said blood being present in an amount sufficient to provide at least 0.1% by weight of blood solids based on finished emulsion, and a water-soluble salt whose anion forms a water-insoluble salt with calcium ions in an amount sufficient substantially to inhibit gel formation in said emulsion.

2. A process of preparing a stable bituminous emulsion which comprises forming a dispersion of bitumen in water, stabilizing said dispersion with homogeneous liquid blood containing fibrinogen in an amount normally sufficient to cause coagulation and gel formation, and inhibiting said coagulation and gel formation with a water-soluble salt whose anion forms a water-insoluble salt with calcium ions, said blood being employed in amount sufficient to provide at least 0.1% by weight of blood solids based on finished emulsion.

3. The process of claim 2 wherein said water-soluble salt is a water-soluble salt of oxalic acid.

4. The process of claim 2 wherein said water-soluble salt is an alkali metal oxalate.

5. The process of claim 2 wherein said water soluble salt is sodium oxalate.

6. An asphalt emulsion of the oil-in-water type, comprising asphalt in amount from about 50 to 60% by weight based on finished emulsion, an aqueous alkaline phase having a pH greater than 9, a stabilizer comprising homogeneous liquid blood which contains fibrinogen in an amount normally sufficient to produce clotting thereof, said blood being present in an amount sufficient to provide at least 0.1% by weight of blood solids based on finished emulsion, and a water-soluble salt whose anion forms a water-insoluble salt with calcium ions in an amount sufficient substantially to inhibit gel formation in said emulsion.

7. The emulsion of claim 6, in which said water-soluble salt is sodium oxalate.

WALTER D. BUCKLEY.
EDWIN P. BLY.